July 12, 1938. A. L. HESTON 2,123,586
TIRE BUILDING APPARATUS
Filed Aug. 28, 1936 5 Sheets-Sheet 1
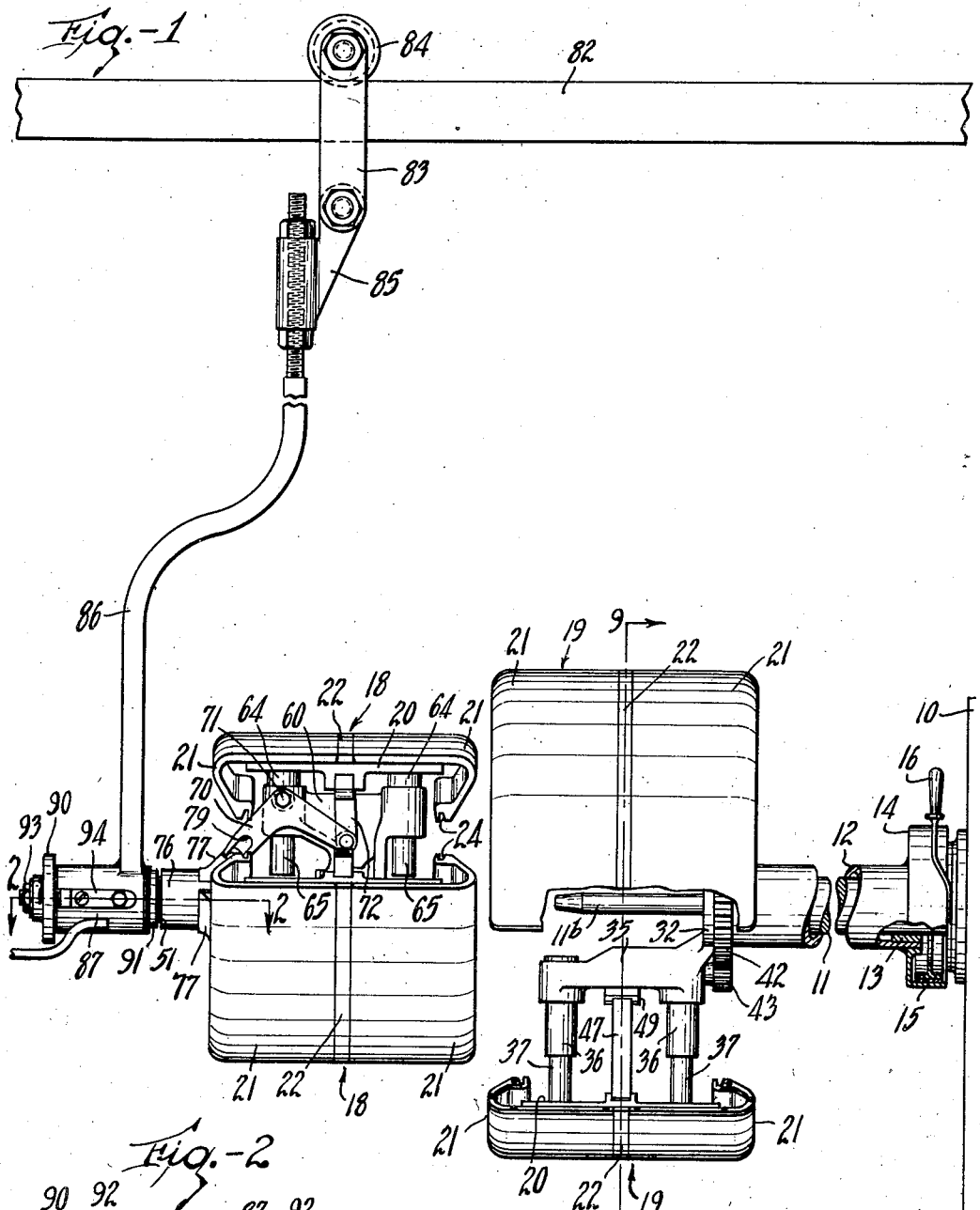
INVENTOR
ALLEN L. HESTON
BY Albert L. Ely
ATTORNEY July 12, 1938.  A. L. HESTON  2,123,586
TIRE BUILDING APPARATUS
Filed Aug. 28, 1936  5 Sheets-Sheet 2
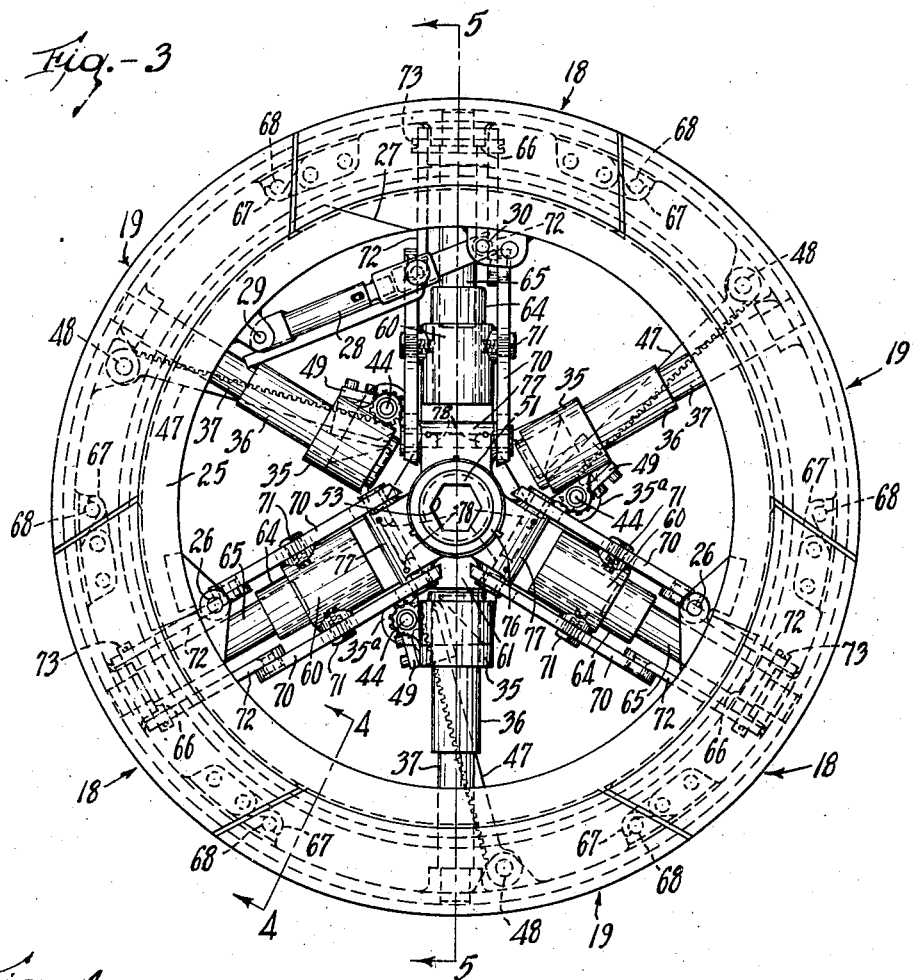
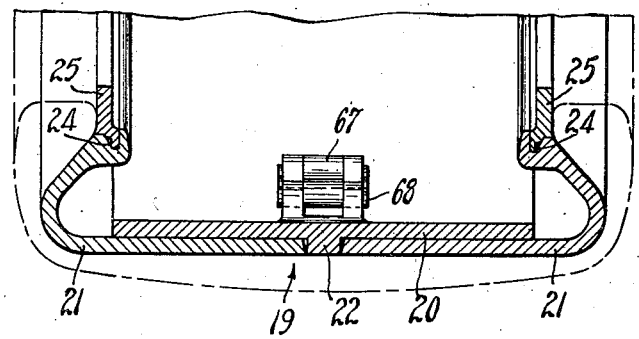
INVENTOR
ALLEN L. HESTON
BY Albert L. Ely
ATTORNEY July 12, 1938.　　　　A. L. HESTON　　　　2,123,586

TIRE BUILDING APPARATUS

Filed Aug. 28, 1936　　　　5 Sheets-Sheet 3

INVENTOR
ALLEN L. HESTON
BY Albert L. Ely
ATTORNEY

July 12, 1938.  A. L. HESTON  2,123,586
TIRE BUILDING APPARATUS
Filed Aug. 28, 1936   5 Sheets-Sheet 4
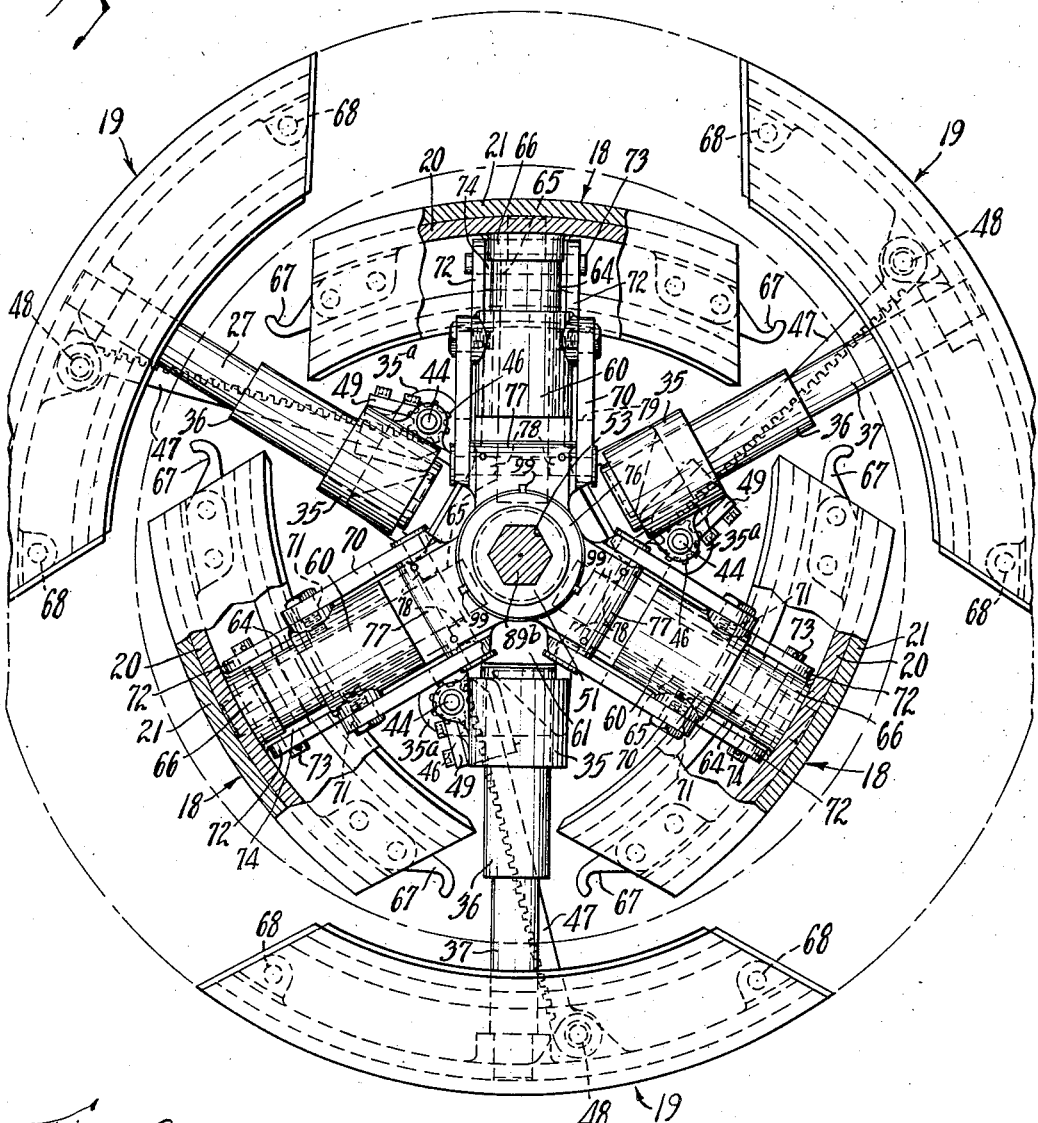
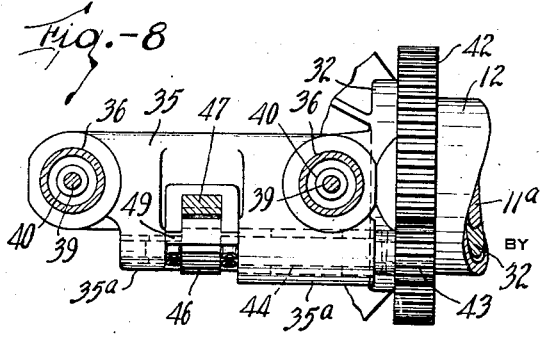
INVENTOR
ALLEN L. HESTON
BY Albert L. Ely
ATTORNEY July 12, 1938. A. L. HESTON 2,123,586
TIRE BUILDING APPARATUS
Filed Aug. 28, 1936 5 Sheets-Sheet 5

INVENTOR
ALLEN L. HESTON
BY
Albert L. Ely
ATTORNEY

Patented July 12, 1938

2,123,586

UNITED STATES PATENT OFFICE 2,123,586

TIRE BUILDING APPARATUS

Allen L. Heston, Akron, Ohio, assignor to National Rubber Machinery Company, Akron, Ohio, a corporation of Ohio Application August 28, 1936, Serial No. 98,291

14 Claims. (Cl. 154—9)

This invention relates to tire building apparatus, and more especially it relates to tire building apparatus comprising collapsible, sectional forms or drums used in the fabrication of pneumatic tire casings having relatively large cross-sectional area and relatively small rim or bead diameter and to associated mechanism for collapsing the drums and for manipulating the collapsed sections thereof.

Because of the small bead diameter of the tires mentioned, it is necessary for the sections of the collapsible forms to have the greatest collapsing movement obtainable, and to this end it has been proposed to provide a collapsible, sectional drum having key sections that are movable axially, when collapsed, out of the tire and out of the normal plane of the drum to allow for maximum collapsing movement of the intermediate drum sections. Such constructions as heretofore provided have included a slidable spindle on the tire building machine for supporting the collapsed key sections, and collapsing of the latter has been effected manually while the drum was stationary.

The chief objects of this invention are to provide an improved collapsible tire building drum wherein the key sections, after being collapsed, may be removed entirely away from the drum and tire building machine; to provide means whereby the collapsing of key sections and intermediate sections of the drum is effected by means of the power that rotates the drum; and to provide for obtaining the greatest possible collapsing movement of the drum sections. Other objects will be manifest as the specification proceeds.

Of the accompanying drawings:

Fig. 1 is a side elevation of apparatus embodying the invention in its preferred form, showing the key sections of the drum in collapsed position and removed from the normal plane of the drum, parts being broken away and in section for clearness of illustration;

Fig. 2 is a section on the line 2—2 of Fig. 1, showing the device for effecting collapse of the key sections of the drum disassociated from the latter;

Fig. 3 is a front elevation of the improved tire building drum in its expanded, operative condition;

Fig. 4 is a section on the line 4—4 of Fig. 3;

Fig. 7 is a front elevation of the improved drum showing the key sections thereof in collapsed condition;

Fig. 8 is a section on the line 8—8 of Fig. 5; and

Figure 5:
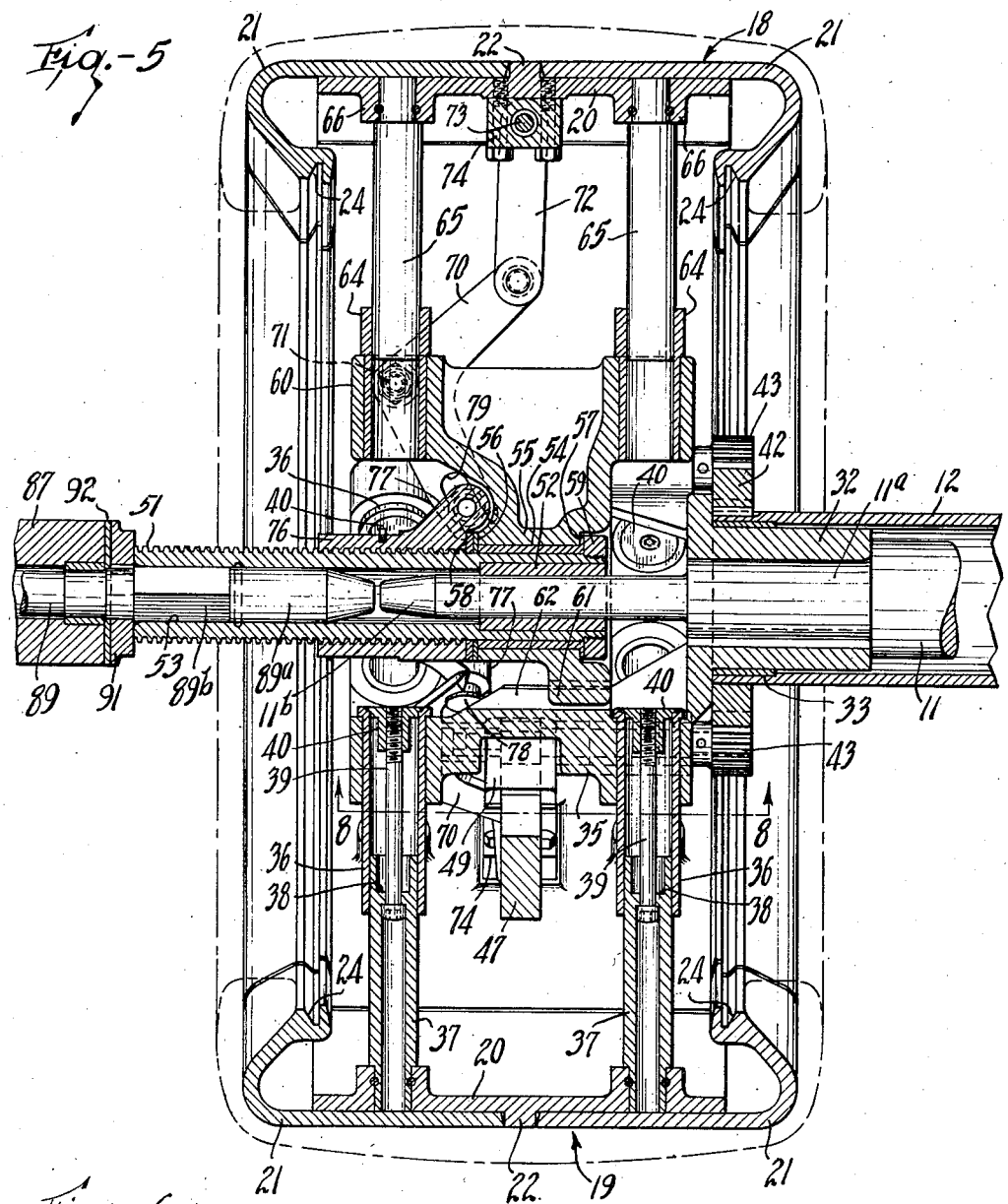
Fig. 5 is a vertical section through the drum, as viewed from line 5—5 of Fig. 3, including a portion of device used for collapsing the key sections.

Referring to the drawings, 10 is a tire building machine of the usual or preferred construction of which 11 is a power driven rotary spindle projecting therefrom and 12 is a sleeve mounted upon said spindle, there being a bushing 13, Fig. 1, mounted between the spindle and sleeve adjacent the inner end of the latter. The sleeve 12 is arranged to rotate with the spindle, as presently will be explained, and, upon occasion, to rotate relatively thereto. Relative rotation of the spindle and sleeve is effected by retarding or preventing rotation of the sleeve while the spindle continues to rotate, and to this end the inner end of the sleeve is provided with an integral brake drum 14. Engageable with the latter is an internal brake band 15 that is operated by means of a hand lever 16.

Mounted upon the outer end of spindle 11 is a collapsible tire building form or drum comprising three key sections generally designated 18, 18 and three intermediate sections generally designated 19, 19, the latter being of somewhat longer length than the key sections. Each of said sections consists of an arcuate drum portion proper 20 and a pair of flange members 21, 21 mounted upon the outer periphery thereof. The outer periphery of each drum portion 20 is formed with a longitudinally extending, central rib 22 of the same height as the thickness of the flanges 21, and the adjacent lateral margins of the latter abut said rib when the flanges are arranged for the building of tire casings of narrowest width. The flanges 21 may be adjustable laterally for the manufacture of tires of wider width, as is well known in the art.

At their outer lateral margins the flanges 21 curve radially inwardly, and each has its inner peripheral margin formed with a longitudinally extending groove 24. When the drum is in expanded, operative condition, the grooves 24 on each side of the drum are endless and each receives the complementally-shaped outer peripheral portion of respective collapsible, articulated trimming rings 25, 25, Figs. 3 and 4. As shown in Fig. 3, each trimming ring 25 consists of three sections that are hinged together at two points 26, 26. At a third point the end sections of the ring meet at a beveled junction 27. The ring 25 is expanded so as to seat in a groove 24 by means of a manually operated latch 28 that is pivotally mounted at 29 on one ring section adjacent the free end thereof and is engageable with a stud 30 mounted upon the adjacent ring section on the opposite side of the junction 27. When mounted in place as shown in Figs. 3 and 4, the rings 25 constitute radially inward extensions of the drum flanges 21, and tire casings built upon the drum have their bead portions built against said rings, as indicated by the broken line profile of a tire shown in Fig. 4. The rings 25 are removed from the drum before the latter is collapsed to remove a tire therefrom. The provision of the said rings makes it possible to collapse the drum sections to a greater extent than otherwise would be possible.

As previously stated, the building drum is mounted upon the outer end portion of spindle 11, and to this end a portion of the latter disposed within sleeve 12 is of reduced diameter, as shown at 11a, Fig. 5, and mounted upon said reduced portion and keyed thereto is a hub structure 32 for the intermediate drum sections 19. The hub structure 32 carries a circumscribing collar or bushing 33, Fig. 5, upon which the outer end of the sleeve 12 is journaled. Forwardly of reduced portion 11a, the spindle 11 is of still further reduced diameter, said reduced portion being designated 11b and being formed with a slightly tapered terminal portion or nose.

Figure 9:
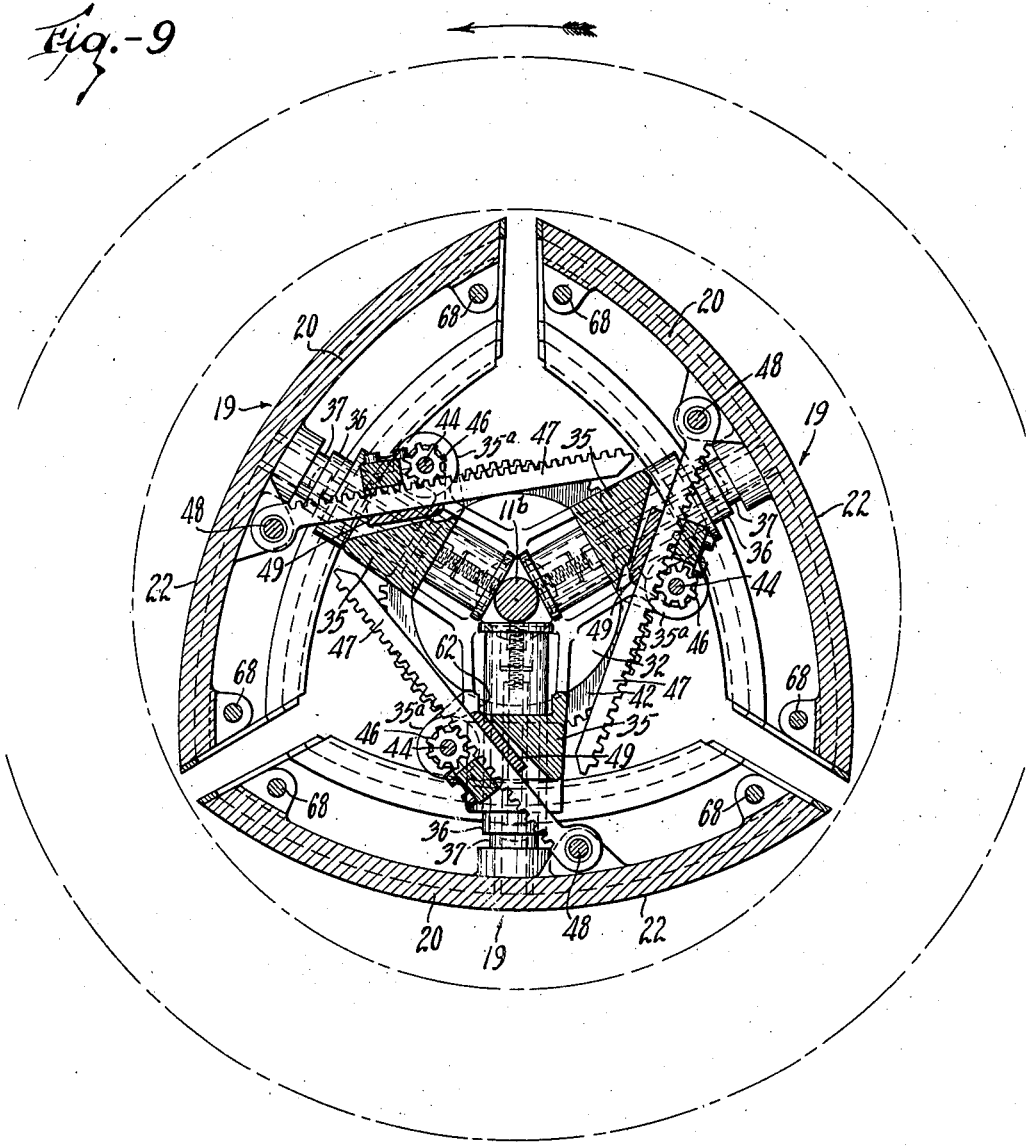
Fig. 9 is a sectional view of the drum, with the intermediate sections thereof in collapsed condition, as seen from the line 9—9 of Fig. 1.

Formed integral with the hub structure 32 and extending axially forwardly therefrom are three overhanging bracket members 35, 35, which members are symmetrically arranged about spindle portion 11b and spaced outwardly therefrom. Each bracket member 35 is formed with two parallel radial bores that are spaced apart axially of the drum, and slidably mounted in the said bores are respective tubular bushings 36, the inner ends of which have outwardly extending flanges that engage the bracket structure to limit radially outward movement of said bushings in said bores. Slidably mounted for axial movement in each bushing 36 is a tubular sleeve 37, the outer end of which is fixedly connected to the drum portion 20 of an intermediate drum section 19. Adjacent its inner end, each sleeve 37 is formed interiorly with a circumferential flange 38 through which extends a headed rod 39, the head of which slides freely within the sleeve and is adapted to engage the flange 38 upon occasion for a purpose presently to be explained. The rod 39 has a sliding fit with the flange 38 and projects a substantial distance beyond the inner end of the sleeve 37 where its end is threaded into a flanged cap or fixture 40 that is permanently secured, as by welding, in a shallow counter-bore in the inner end of bushing 36. The structures described constitute radial supports and guides for the intermediate drum sections 19. When the latter are in their collapsed position, as shown in Fig. 9, the rods 39 are completely telescoped with the sleeves 37, the latter are in engagement with the rod-caps 40, and the caps 40 and the inner ends of bushings 36 are in abutting relation with spindle end 11b. Thus the spindle end limits the inward, collapsing movement of the drum sections 19, and because of its reduced diameter, it permits maximum collapsing movement of said sections. Because of the sectional, telescopic character of the drum-section supports, adequate support for the drum sections is provided when the latter are in operative, expanded position. Engagement of the flanged ends of bushings 36 with the bracket structures 35 provides means for limiting the outward movement of the drum sections, and the feature of threading the rods 39 into the caps 40 provides for adjusting the length of the rods whereby the proper expanded positioning of the intermediate drum sections accurately and easily is achieved.

The collapsing and expanding of the intermediate drum sections 19 are effected by power means, and to this end a ring gear 42 is keyed to the outer end of the sleeve 12, and meshed with said gear are three symmetrically disposed pinions 43, 43 that are mounted upon one end of respective shafts 44, the latter being parallel to the axis of the drum and to each other. As is most clearly shown in Fig. 8, each shaft 44 is journaled in axially spaced apart bearing structures 35a, 35a formed on one of the brackets 35, and between the said bearing structures, in the medial plane of the drum, each shaft 44 is provided with a pinion 46. The pinions 46 mesh with respective racks 47, the outer ends of which are pivotally connected, at 48, to the drum portions 20 of the respective intermediate sections 19. Each pinion 46 and rack 47 are retained in meshed relation by means of a yoke or guide 49 that is swiveled upon the shaft 44 on each side of said pinion. Each bracket 35 is suitably cut away, as is most clearly shown in Fig. 9, to permit of angular movement of said yoke during the expanding and collapsing of the intermediate drum sections.

Collapsing of the intermediate drum sections 19 is effected during intervals in which the key sections of the drum are removed. To collapse the intermediate drum sections, the spindle 11 is driven so as to rotate the drum sections in the direction indicated by the arrow in Fig. 9, the sleeve 12 and gear 42 thereon rotating with said spindle for the reason that centrifugal force urging the drum sections outwardly is sufficient to counteract any tendency of the pinions 43 to move relatively of said gear 42. When the sections are rotating as described, application of brake 15 to brake drum 14 on sleeve 12 slows down or stops the latter, causing gears 43 to move in the manner of planetary gears about gear 42 and thereby to be rotated and thus to rotate their shafts 44 and pinions 46 thereon. This moves the racks 47 and drum sections 19 connected thereto inwardly, which inward movement continues until the rod caps 40 engage reduced portion 11b of the spindle 11. The drum sections 19 are expanded by driving the spindle 11 in the opposite direction and applying the brake to the sleeve 12 in the manner described. The brake is applied gently so that it may be immediately released when the drum sections attain the positions desired. Engagement of the inner ends of bushings 36 with the bracket structures 35 determines the outward limit of movement of the sections.

The key sections of the drum are a separate unit that may be completely removed from the drum to facilitate the collapsing of the intermediate sections and the removal of a finished tire casing therefrom. The key section unit comprises an axially disposed, hollow, elongate screw member 51, and mounted within one end thereof is an axial tubular bushing 52, Fig. 5, that is receivable upon the reduced portion 11b of spindle 11. The screw 51 is of such length as to extend forwardly of the plane of the drum a substantial distance, and at its forward end the interior of the screw is locally formed with hexagonal walls, the same constituting a socket 53 for the reception of a collapsing tool or member subsequently to be described. The major portion of the screw 51, from its forward end rearwardly, is exteriorly threaded as shown, its rear end portion being of slightly reduced diameter and unthreaded and having a bearing bushing 54 mounted thereon. Journaled upon the bushing 54 is a hub structure 55 for the key sections, said hub structure being retained against axial movement by a thrust washer 56 on one side thereof and a flange 57 on the bushing 54 on the other side thereof. A washer 58 is positioned between the thrust washer 56 and the major threads on the screw, and a nut 59 threaded onto the inner end of screw structure 51 retains the assembly on the latter. The hub structure 55 is formed with three radially extending bracket structures 60, 60 that overhang the hub fore and aft, and in the assembled, operative condition of the drum are in intercalated relation to brackets 35 of hub 32 of the intermediate drum sections. At its inner end, between two of the brackets 60, the hub 55 is formed with a radially projecting lug 61 that is engageable in a forwardly opening, axially extending groove 62 formed in one of the brackets 35 of hub 32, as is most clearly shown in Figs. 5 and 9. The arrangement is such as to assure accurate registry of hubs 55 and 32 and provides adequate interlocking of the hubs so that hub 55 will be rotated by hub 32 when the latter is driven.

Each bracket structure 60 is formed with two parallel, spaced apart, radial bores in which are mounted respective tubular bushings 64, the latter being disposed in the same plane as the bushings 36 of the other hub 32 in the assembled condition of the drum. The bushings 64 project outwardly beyond the brackets 60, and slidably mounted in each of said bushings is a heavy rod or spindle 65, the outer end of which is secured in a boss 66 formed on the inner peripheral face of drum portion 20 of a key section 18. There are two rods 65 for each key section, said rods guiding the latter in their collapsing and expanding movements. Because of their shorter length, the key sections do not require to be collapsed to the same extent as the intermediate sections in order that they will be positioned inwardly of the bead diameter of a tire casing built upon the drum, said bead diameter being indicated by a broken line circle in Fig. 7. Collapsing movement of the key sections is limited by the bushings 64, the outer ends of which are engaged by the bosses 66 of the key sections when the latter are completely collapsed. The outward, expanding movement of the key sections is limited by the expanding mechanism presently to be described and by hooks 67 mounted at the respective ends of the key sections and engageable with suitable studs or pins 68 mounted at opposite ends of the intermediate sections.

Mechanism for expanding and collapsing the key sections 18 comprises a pair of bell cranks 70, 70 for each key section, the respective bell cranks of each pair being pivotally mounted at their elbows upon respective pivot pins 71 projecting laterally from opposite sides of each bracket 60, near the front end of the latter. One arm of each bell crank extends obliquely rearwardly toward the axis of the drum, and the other arm extends obliquely rearwardly and radially outwardly in the direction of the drum sections. The free ends of the latter arms of each pair of bell cranks are pivotally connected to one end of respective links 72, the other ends of said links being pivotally connected to opposite ends of a pivot pin 73 that is mounted in a fixture 74 that is secured to the inner periphery of drum 74 of a key section 18, centrally thereof.

For rocking said bell cranks 70, a nut 76 is threaded onto the thread portion of screw 51, forwardly of hub 55 thereon, said nut being formed with three, symmetrically arranged, radially extending ears 77. Projecting laterally from opposite sides of the respective ears 77 are headed or flanged studs 78, 78 that engage in respective longitudinally extending slots 79 formed in the free ends of the radially inwardly extending arms of bell cranks 70.

The arrangement is such that axial movement of the nut 76 toward the front end of screw 51 will effect collapse of the key sections 18 to the position shown in Fig. 7. Reverse travel of the nut 76 will expand the sections to operative position in circumferential alignment with intermediate sections 19. When the drum is in operative, expanded condition and rotating, all of the elements previously described, including screw 51, will rotate about the axis of the drum because of the interengagement of said elements. The screw 51, however, may be restrained or held against rotation, and when so held, relative angular movement between said screw and the rotating nut 76 will cause the latter to travel longitudinally of the screw to collapse or expand the key sections. Thus the key sections are collapsed or expanded by power from the spindle 11.

The mechanism for restraining rotation of the screw 51 is combined with apparatus for moving the key section assembly, after collapse, out of the plane of the drum and to a point sufficiently remote to permit a tire to be removed from the collapsed drum simply by removing it off the collapsed intermediate drum sections 19. Said apparatus is shown in Fig. 1, wherein 82 is an overhead track rail, 83 is a carriage suspended from wheels 84 that ride on said track rail, 85 is a connection pivotally suspended from said carriage, 86 is a reversely curved hanger rod extending downwardly from said connection, and 87 is a cylindrical hub fixedly mounted on the lower end of said rod 86. The hanger rod 86 is vertically adjustable in the connection 85 so that the axis of hub 87 may be aligned with the axis of the drum, and the track rail 82 is disposed parallel to the axis of the drum, at least in the region thereof that is disposed directly above the drum and adjacent thereto.

Axially journaled in the hub 87 is a spindle 89, and mounted upon opposite ends of the hub are caps 90, 91, respectively, to which said spindle is keyed, there being thrust washers 92 positioned between the hub and the respective caps. The spindle projects from the hub at the end thereof nearest the drum, the projecting portion of the spindle comprising a cylindrical terminal portion 89a having a tapered nose and adapted to fit within the cylindrical portion of the bore of screw 51, and a hexagonal portion 89b receivable within the hexagonal socket formed in the forward end of said screw 51. The hexagonal portion 89b of the spindle constitutes a shoulder that abuts cap 91, and the hub and spindle are retained in assembled relation by a nut 93 that is threaded onto the spindle and abuts cap 90.

The latter is of larger diameter than the hub, and in its radially projecting portion is formed with a bushed aperture. An angular fixture 94 is secured to the hub 87 with a portion of its structure formed with a bushed aperture that is aligned with the similar aperture in cap 90. A hardened steel shear pin 95 is mounted in said aligned apertures, the arrangement being such that said pin will be sheared off if torque in the spindle 89 is excessive.

In order to protect the operator of the machine from accidental contact with that portion of the screw 51 that projects forwardly beyond the drum, a removable guard is provided, which guard is mounted upon the screw during the building of a tire and removed therefrom before the drum is collapsed to remove the tire. Said guard comprises a hollow cylindrical structure 97, Fig. 6, having a closed outer end and having its inner end of such size as to fit over the cylindrical forward end of nut 76 and formed with bayonet slots, such as the slot 98, for engagement with respective studs 99 projecting radially from said hub. Within the cylinder is a compression spring 100 positioned between the closed end of the cylinder and a generally cylindrical seat 101. The latter is formed with a countersunk recess 102 that closely fits the end of the screw 51 when the structure is mounted thereon. A stud 103 extends through cylinder 97 and is engageable with a marginal portion of seat 101 for retaining the latter in the cylinder. When the guard is mounted upon the screw 51, the spring 100 serves to effect sufficiently firm engagement of the bayonet slot 98 and studs 99 as securely to retain the guard in place while the drum is rotating, yet permitting quick and easy removal of the guard when desired.

Figure 6:
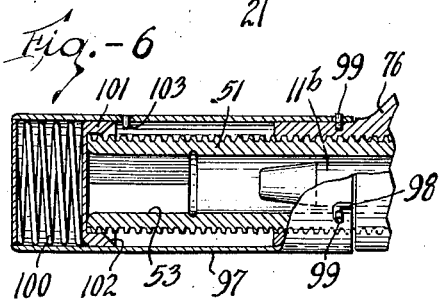
Fig. 6 is a longitudinal section through the outer end portion of the axial structure of the key sections, including a shield or guard that is placed over said structure while a tire is being built upon the drum.

In the operation of the apparatus, let it be assumed that the drum is in the expanded, operative condition shown in Fig. 3, that the trimming rings 25 are in place as shown, and that the guard 97 is mounted upon the forward end of the screw 51 as shown in Fig. 6. The spindle 11 is then driven to rotate the drum and the sleeve 12, and a tire casing is fabricated upon the drum in any known or preferred manner. The cross-section of the tire is indicated in broken lines in Fig. 4 to show the position of the inside diameter of the tire with relation to the trimming rings 25 and the smaller diameter of the drum flanges 21. When the building of the tire casing is completed, rotation of the drum is stopped, the guard 97 is removed from the front end of screw 51, and the trimming rings 25 are collapsed and removed from the drum. Then the mobile apparatus that comprises the spindle 89 is moved into place and said spindle is inserted into the axial opening of screw 51 so that hexagonal portion 89b of said spindle engages in the complementally shaped socket 53 of the said screw, as shown in Fig. 5.

While the screw 51 is held stationary by the spindle 89, rotation of the drum is resumed, the direction of rotation being such that relative movement of the screw 51 and nut 76 causes the latter to move axially toward the forward end of the screw. This produces angular movement of the several pairs of bell cranks 70, with which the nut is engaged, and draws the key sections 18 radially inwardly until such inward movement is stopped by engagement of the bosses 66 with the upper ends of bushings 64. Rotation of the drum is stopped as soon as this condition is reached. The position of the key sections in collapsed position is shown in Fig. 7, the broken line circle outside said key sections indicating the smallest diameter of the tire casing. Since the hooks 67 are now disengaged from the pins 68 of the intermediate sections, it is possible to draw the entire key section assembly forwardly, as a unit, out of the plane of the drum, as shown in Fig. 1, and out of the tire on said drum, the spindle 89 providing support for the assembly when so removed. The key section assembly may be moved to a sufficiently remote point to allow plenty of space in front of the drum for subsequent removal of the tire therefrom.

The drum, now consisting solely of the intermediate sections, is again driven in the direction indicated by the arrow in Fig. 9, and the brake applied to the brake drum 14 of sleeve 12 by means of hand lever 16, so that the intermediate sections 19 are collapsed in the manner hereinbefore described. The tire casing may then be removed from the collapsed drum. Thereafter the drum is restored to expanded, operative condition by reversing the collapsing operations described, thereby completing a cycle of operation.

The invention provides such complete collapse of the drum that tires are removed therefrom without difficulty, the collapsing and expanding of the drum is accomplished by power-operated means, and the other advantages set out in the foregoing statement of objects are achieved.

Modification may be resorted to without departing from the spirit of the invention or the scope of the appended claims.

What is claimed is:

1. Tire building apparatus comprising a sectional tire building drum having key sections movable radially toward the axis of the drum and laterally out of the operative plane of the drum and intermediate sections movable radially toward the axis of the drum after the key sections have been moved laterally of the operative plane of the drum, power means for rotating the drum, and means for utilizing said power means for effecting radial movement of the key sections and of the intermediate sections.

2. Tire building apparatus comprising a sectional tire building drum having a plurality of key sections movable radially toward the axis of the drum and laterally out of the operative plane of the drum, said key sections being connected to an axial member that is angularly movable relatively of the drum to effect collapse of said key sections, power means for rotating the drum, and non-rotative means engageable with said axial member for preventing the same from rotating with the drum.

3. Tire building apparatus comprising a sectional tire building drum having a plurality of key sections movable radially toward the axis of the drum and laterally out of the operative plane of the drum, said key sections being connected to an axial member that is angularly movable relatively of the drum to effect collapse of said key sections, power means for rotating the drum, and a mobile structure having a non-rotative element engageable with said axial member for preventing the same from rotating with the drum to effect collapse of the key sections and for supporting the key section assembly when it is moved laterally out of the plane of the drum.

4. A combination as defined in claim 3 in which the axial member of the key sections is tubular, and the non-rotative element of the mobile structure is formed as a spindle adapted to be telescoped with the tubular axial member for at least a portion of its length.

5. A combination as defined in claim 3 in which the axial member of the key sections is tubular and is formed at its outer end with a polygonal socket, and the non-rotative element of the mobile structure is a spindle that is formed with a polygonal portion engageable in said socket.

6. Tire building apparatus comprising a sectional tire building drum having key sections and intermediate sections radially movable in the operative plane of the drum, a screw at the axis of said drum, a nut on said screw, power means for rotating the drum, means for utilizing the said power means for effecting relative rotation of the screw and nut so as to move the latter longitudinally of the screw, and bell cranks connecting said nut to the respective key sections whereby axial movement of the nut effects radial movement of said sections.

7. Tire building apparatus comprising a sectional tire building drum comprising radially movable key sections and radially movable intermediate sections, a rotatable spindle supporting and driving said drum, a hub connected to the intermediate sections and fixed to one region of said spindle, a tubular sleeve journaled on another region of said spindle, a portion of said sleeve being exteriorly threaded, a hub for the key sections journaled on an unthreaded portion of said sleeve, a nut on the threaded portion of said sleeve, and means connecting said nut to said key sections for effecting radial movement of said key sections when the nut is moved relatively of the threaded sleeve.

8. A combination as defined in claim 7 including means for effecting relative angular movement of the threaded sleeve and driving spindle for causing axial movement of the nut along the sleeve.

9. Tire building apparatus comprising a power driven spindle, a sectional tire building drum mounted thereon, said drum comprising radially movable intermediate sections and a key section assembly removable as a unit out of the operative plane of the drum, a sleeve surrounding said spindle and movable angularly relatively thereto, a ring gear on said sleeve, gear means connecting said ring gear to the respective intermediate sections for effecting radial movement of the latter, and means for retarding angular movement of the ring gear and sleeve while the spindle continues to rotate.

10. A combination as defined in claim 9 including radially disposed guide means carried by the respective intermediate sections, said guide means being engageable with the drum-spindle for limiting the collapsing movement of the sections.

11. Tire building apparatus comprising a power driven spindle, a sectional tire building drum mounted thereon, said drum comprising radially movable intermediate sections and a key section assembly removable as a unit out of the operative plane of the drum, means for effecting radial movement of the intermediate sections when the key sections are removed, a hub for said intermediate sections mounted on said spindle, radial guide rods carried by the respective intermediate sections extending through overhanging portions of the hub and adapted to engage said spindle to limit the collapsing movement of said sections, and means on the inner ends of said guide rods engageable with the hub structure for limiting the outward movement of the guide rods as a means for determining the expanded, operative position of the intermediate sections.

12. A combination as defined in claim 11 in which the last mentioned means is adjustable for varying the effective length of the guide rods.

13. Tire building apparatus comprising a power driven spindle, a sectional tire building drum mounted thereon, said drum comprising radially movable intermediate sections and a key section assembly movable out of the operative plane of the drum, a hub on said spindle, radially disposed guide rods fixed to the respective intermediate sections and slidably mounted in said hub, a sleeve surrounding said spindle and movable angularly relatively thereto, brake means engageable with said sleeve for retarding rotation thereof relatively of the spindle, a ring gear fixed on said sleeve, respective racks connected to said intermediate sections, and gear means between said racks and said ring gear for effecting radial movement of the intermediate sections when the rotation of the ring gear and sleeve is retarded with relation to the rotation of the spindle.

14. Tire building apparatus comprising a sectional tire building drum comprising a key section assembly removable as a unit out of the operative plane of the drum when in collapsed condition, said unit including a member adapted to collapse the key sections upon relative rotative movement of the member and the drum, and means engageable with said member for effecting said relative rotary movement, said means including a member designed to fracture under excessive strain.

ALLEN L. HESTON.